Dec. 7, 1926.                                              1,610,087
                       B. M. W. HANSON
                            TAP
                      Filed March 26, 1924

Inventor
Bengt M. W. Hanson
by
H. Clay Lindsey
His Attorney

Patented Dec. 7, 1926.

1,610,087

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

TAP.

Application filed March 26, 1924. Serial No. 701,985.

The aim of the present invention is to provide an improved tap, the purpose being to eliminate some of the objections and disadvantages particularly incident to tapered pipe taps as heretofore constructed.

Generally speaking, tapered pipe taps as heretofore made have had their teeth so shaped and arranged that the top and two sides of each tooth would cut simultaneously, taking out a chip which is of approximately V- or U-form with the result that the chip would not roll upon itself or curl, and since the chips could not readily free themselves the flutes would become clogged up. On account of this and other difficulties, these old taps resulted in faulty work leaving the thread on the stop with rough and uneven surfaces, the power required for cutting the thread was excessive, and the heat generated and the strains and stresses under which the teeth operated dulled the tap very quickly.

In accordance with the present invention these disadvantages and objections have been minimized or entirely eliminated by so shaping the teeth that some of the teeth cut flat chips from the bottom of the thread groove and other teeth cut flat chips from the sides of the groove. More particularly, my improved tap is provided with a plurality of inclined rows or lands of teeth, the teeth of each row being similar to each other, and the teeth of every other row being adapted to take a relatively flat chip from the bottom of the thread groove being formed in the stock, and the teeth of the intervening alternate rows being shaped to take cuts in the sides of the groove without engaging or rubbing the bottom of the grooves. If desired, those teeth which cut on their side edges may have the same or a slightly lesser height and the same width as the teeth of taps as heretofore constructed. Those teeth which cut at their outer ends are of slightly greater outside diameter than the side cutting teeth. It will thus be seen that each of the teeth will cut chips which are flat, as distinguished from angular in cross section, and as these chips will readily curl, clogging of the flutes is eliminated, and, therefore, the tool will not stick, it operates more smoothly, and injury to the tool and work is prevented. It will further be seen that, since no one tooth cuts both on its end and on its sides, the burden imposed upon one tooth, and, therefore, the strains and wear to which it is subjected, are materially reduced so that the tool will have a longer effective life.

In the accompanying drawing, wherein I have shown, for illustrative purposes, one embodiment which the present invention may take, it being understood, however, that this disclosure is by way of exemplification only and that the invention is susceptible of various modifications and changes which would be within the spirit of the invention without departing from the scope of the appended claims:

Figure 1:
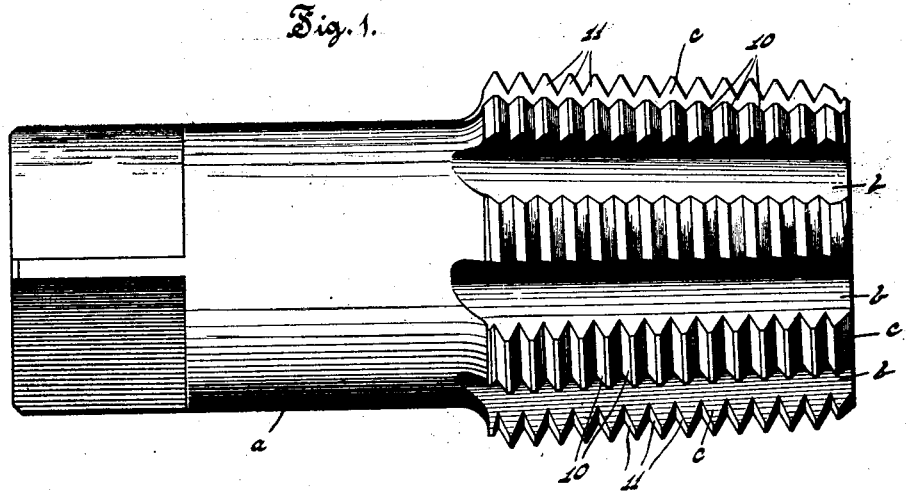
Figure 1 is a side elevation of my improved tap.
Figure 2:
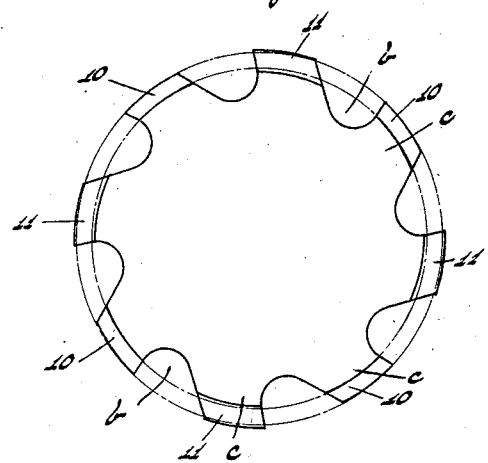
Fig. 2 is a diagrammatic view in transverse section or end elevation.
Figure 3:
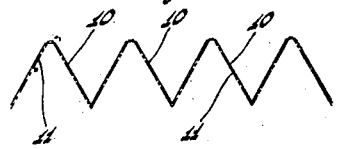
Fig. 3 is a diagrammatic view showing in full lines one series of side cutting teeth and in dotted lines a series of end cutting teeth.

In the drawings, the improvements of the present invention are illustrated as being incorporated in a pipe tap having a cylindrical shank $a$ and a tapered portion which is divided by longitudinally extending flutes $b$ into a plurality of lands $c$. These lands, which are inclined to the axis of the tap, are provided with a plurality of teeth which are helically arranged. These teeth, in effect, form a spiral thread which is interrupted by the flutes. The series of teeth on each land are identical to each other, but since the lands are inclined, the successive teeth will cut deeper into the work as the tap is advanced. In accordance with the present invention the teeth on alternate lands are adapted to cut on their side edges only, and the teeth on the intervening lands are adapted to cut on their end edges only. The side cutting teeth are designated by the numeral 10, and the end cutting teeth by the numeral 11. As shown most clearly in Figs. 2 and 3, the outside and root diameters of the side cutting teeth are of standard or normal dimensions, that is to say, in cross section they correspond to the actual or desired shape and size of the thread groove to be formed in the end of a pipe fitting or the like. The end cutting teeth 11 extend radially beyond the ends of the side cutting teeth, and their root diameters are less than those of the adjacent teeth 10. Preferably, each tooth is relieved back of its cutting edge, as is usual.

In operation, the end cutting teeth 11 will cut chips from the bottom of the groove being formed and will clear the sides of the groove so that these chips, being substantially flat, may readily curl and work out of the flutes; each end cutting tooth is followed by a side cutting tooth, and each of these side cutting teeth will cut a chip from each side of the thread groove, and these chips, being relatively flat, will roll upon themselves so that they can work out of the flutes. Since each side cutting tooth is preceded by an end cutting one, the end edge of the side cutting teeth does not engage the work, thus the duty of cutting the bottom of the groove is assigned to alternate teeth, and the duty of cutting the sides of the thread groove is performed by the intervening teeth. In no instance is a V or U-shaped chip cut, with the resultant disadvantages previously pointed out.

Figure 4:
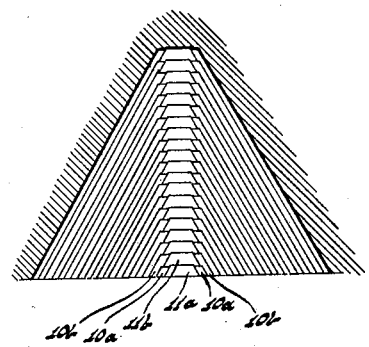
Fig. 4 is a diagrammatic view showing the manner in which successive cuts are taken in the stock when my improved tool is employed.
Figure 5:
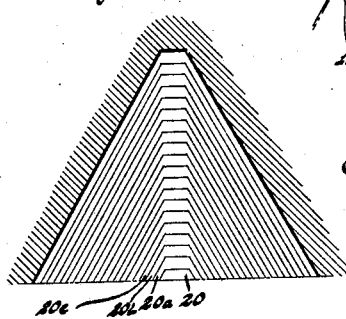
Fig. 5 is a view similar to Fig. 4, but showing the cuts which are taken with the ordinary tap, as heretofore constructed.

Referring more specifically to Fig. 4, the first tooth 11 at the small end of the tap may be assumed to cut out a chip $11^a$; the side cutting tooth following that first end cutting tooth will take out chips $10^a$; the next end cutting tooth will take out a chip $11^b$; and the next side edge cutting tooth will take out chips $10^b$, and so on in regular succession, an end edge cutting tooth first operating and then a side edge cutting tooth. The advantage of thus cutting the groove will be clear from a comparison of Figs. 4 and 5. In this latter figure, wherein is shown the manner in which chips are cut with the ordinary tap, the first tooth on the ordinary tap will take out a relatively flat chip 20, and the succeeding teeth will successively cut U-shaped chips $20^a$, $20^b$, etc.

I claim as my invention:—

1. A tapered tap having alternate teeth adapted to cut on their end edges only, and intervening teeth adapted to cut on their side edges only, said intervening teeth being of less height than the alternate teeth.

2. A tapered pipe tap having spirally arranged teeth with alternate teeth of greater radial extent and less width than intervening teeth.

3. A tap having inclined lands provided with teeth, the teeth of each land being similar in cross-section, the teeth of alternate lands being of like width as the width of the groove to be cut and being no greater in heighth than the depth of the groove, and the teeth of intervening lands having a lesser width and a greater outside diameter than said first mentioned teeth.

BENGT M. W. HANSON.